United States Patent [19]

Flakus

[11] Patent Number: 4,722,966

[45] Date of Patent: Feb. 2, 1988

[54] STORAGE-STABILE, RADIATION-HARDENABLE, NCO-FREE AQUEOUS EMULSIONS

[75] Inventor: Werner Flakus, Recklinghausen, Fed. Rep. of Germany

[73] Assignee: Huls Aktiengesellschaft, Marl, Fed. Rep. of Germany

[21] Appl. No.: 886,681

[22] Filed: Jul. 18, 1986

[30] Foreign Application Priority Data

Jul. 20, 1985 [DE] Fed. Rep. of Germany ....... 3526016

[51] Int. Cl.$^4$ ............................................. C08G 18/34
[52] U.S. Cl. .................................... 524/840; 522/86; 524/839; 528/61; 528/71; 528/75
[58] Field of Search ................... 522/86; 524/839, 840

[56] References Cited

U.S. PATENT DOCUMENTS

| | | | |
|---|---|---|---|
| 4,039,414 | 8/1977 | McGinniss | 522/86 |
| 4,070,323 | 1/1978 | Vanderhoff | 524/839 |
| 4,147,679 | 4/1979 | Scriven | 524/839 |
| 4,287,039 | 9/1981 | Buethe | 522/86 |
| 4,310,448 | 1/1982 | Reischl | 524/839 |
| 4,497,932 | 2/1985 | Trovati | 524/839 |

Primary Examiner—Melvyn I. Marquis
Assistant Examiner—A. H. Koeckert
Attorney, Agent, or Firm—Oblon, Fisher, Spivak, McClelland, & Maier

[57] ABSTRACT

A storage-stabile, radiation-hardenable, NCO-free aqueous emulsions based on ionic urethane-urea acrylates is disclosed. The emulsions are made up of partially acrylated cycloaliphatic polyisocyanates which have been acrylated by a hydroxyalkyl acrylate (to the extent of 10-60 equivalent-% NCO). These products are then reacted with polyhydroxy compounds (to the extent of 20-75 equivalent-% NCO), and then with sodium salts of aminocarboxylic acids (to the extent of 5-15 equivalent-% NCO), and finally they are reacted with water and/or aliphatic diamines (said aliphatic diamines in amounts corresponding to 1-5 equivalent-% NCO).

The reaction product of the cycloaliphatic polyisocyanate with the hydroxy acrylate compounds and the polyols is taken up into ordinary organic solvents, and these solvent-containing reaction products are converted with aqueous solutions of the sodium salts of aminocarboxylic acids and then with water and/or with an amount of aliphatic diamines corresponding to 1-5 equivalent-% NCO, whereafter the organic solvent is distilled off.

18 Claims, No Drawings

STORAGE-STABILE, RADIATION-HARDENABLE, NCO-FREE AQUEOUS EMULSIONS

BACKGROUND OF THE INVENTION

1. Field of the Invention

This invention relates to radiation-hardenable resins useful in paint and varnish applications.

2. Discussion of the Background

Radiation-hardenable resins possess characteristics which make them useful in paint and varnish applications. The current state of development of such resins provides a hardened film having good mechanical properties. And the coating produced possesses good weather and chemical resistance.

The amount of monomers in these resins may be small or large, depending on the viscosity desired and the intended application. The monomers referred to are low molecular weight components—so-called "reactive thinners". Examples are vinyl acetate, vinylpyrrolidone, and alkyl acrylate esters.

These systems however have disadvantages in coating absorptive or porous substrates. These disadvantages include (1) the possibility that the resin or some of its components penetrate into the substrate, and (2) the hardening of the absorptive substrate after hardening of the resin. In the case of highly porous substrates, the portions of liquid which penetrate deeply do not become polymerized in the radiation-hardening step, or they become incompletely polymerized. They remain in liquid form in the substrate.

These low molecular weight "reactive thinners" find use in adjusting the viscosity of the resin and regulating the layer thickness. They are used in amounts of 20–70 wt. % along with higher molecular weight resin components. In general, they present health hazards or have objectionable odors.

Even when all of the components of the resin system are polymerized to a high degree, i.e., when the "reactive thinners" are incorporated into the polymerized system, the hardened film or coating will often retain the characteristic odor of the starting resin, even after hardening. This odor is essentially that of the "reactive thinners" and is perceived as objectionable. Also, it is difficult to employ resins containing "reactive thinners" to produce thin films having a thickness after hardening of 5 or 10 microns unless additional conventional solvents are incorporated. These are evaporated prior to the radiation hardening. Accordingly, the problem presented is to reduce or eliminate these disadvantages.

Reducing the quantity of "reactive thinners" used by adding water to these compositions leads to water-in-oil dispersions which, after hardening, yield serviceable films. A disadvantage with this approach however is that the oil-in-water dispersions formed are not stabile, and that the "reactive thinners" are water-thinnable only to a limited degree. Another disadvantage is that after physical drying the films formed are initially tacky, objectionable odors are produced, and some of the "reactive thinners" are lost by evaporation.

Obtaining direct molten dispersions of acrylic resins in water without using low viscosity monomers is difficult. Such directly dispersed molten resins have high viscosities. And there is a risk of thermal activation of the acrylic components, i.e. premature polymerization, since such systems are susceptible to thermal activation at processing temperatures above 100° C.

Accordingly, the technological solution of these problems requires the use of classical solvents (e.g., acetone) acting as diluents and suppressing the premature activation problems. After transfer of the system into an aqueous phase, the acetone components are removed by distillation, yielding a radiation-reactive aqueous dispersion which is free of both "reactive thinners" and organic solvents.

In view of the characteristics desired, urethane acrylic monomer systems are candidates for use in these systems. E.g., polyisocyanates can be partially acrylated with the aid of hydroxyalkyl acrylates. The resin character of the urethane acrylate is affected by additional chemical reactions with polyols, to establish the set of characteristics of the hardened film.

By incorporating a certain proportion of acid groups (e.g., —COOH, —SO$_3$H, etc.), these resins can be water-dispersed with the aid of alkali hydroxides (e.g., NaOH, KOH). Also, such resins can be water-dispersed with the aid of inorganic or organic acids, by incorporating a certain proportion of tertiary amines (hydroxyamines, etc.). After removal of the acetone by distillation, a solvent-free aqueous solution or dispersion should theoretically remain. But it has turned out, however, that resins produced by this scheme coagulate, either prior to the removal of the acetone or a few hours after the preparation of the dispersion. Many aqueous dispersions form solid, dry, matte films, and the dispersions coagulate after a short time (due to the fact that there are emulsified as well as suspended portions present).

When one starts with aliphatic diisocyanates, such as 1,6-hexanediisocyanate (HDI), methyl-1,6-hexanediisocyanate, or trimethyl-1,6-hexanediisocyanate, stagewise acrylation, urethane-formation, and emulsification do not yield a stabile emulsification of the resulting resin. If triols are used as co-components, the resin gelatinizes, and the triols are expelled to form suspended elements of the emulsion, with subsequent paste-formation. When the film dries it forms a cracked, matte layer which is unusable.

There is thus a strongly felt need for a storage-stable, radiation-hardenable, NCO-free aqueous emulsion not suffering the above disadvantages.

SUMMARY OF THE INVENTION

Accordingly, one object of this invention is to provide a storage-stable aqueous emulsion.

It is another object of this invention is to provide a storage-stable, radiation-hardenable aqueous emulsion.

It is another object of this invention to provide a storage-stable, radiation-hardenable, and NCO-free aqueous emulsion.

It is another object of this invention to provide a storage-stable, radiation-hardenable, NCO-free aqueous emulsion which remains storage-stabile after removal of an organic solvent, e.g. acetone, via distillation.

It is another object of this invention to provide such aqueous emulsions which at room temperature yields glossy, non-tacky films.

It is another objection of this invention to provide such aqueous emulsions which after radiation-hardening yields serviceable coatings.

It is another object of this invention to provide such aqueous emulsions which are advantageously used with absorptive or porous substrates.

The inventor has now surprisingly, discovered an aqueous emulsion which satisifes all of these objects of the invention and other objects which will become apparent from a reading of the disclosure given hereinbelow. This invention relates to the inventor's discovery that starting with cyclic polyisocyanates which are partially converted with saturated or unsaturated polyols, particularly triols, one can convert the still NCO-containing acetonic prepolymer into an aqueous dispersion with aqueous solutions of sodium salts of monoaminocarboxylic acids, along with water and/or aliphatic diamines as reactants. Urea is formed. After removal of the acetone by distillation, these aqueous dispersions form storage-stabile aqueous anionic emulsions which at room temperature yield glossy, non-tacky films. And after radiation-hardening, they yield serviceable coatings.

Accordingly, this invention provides storage-stabile, radiation hardenable, NCO-free aqueous emulsions based on ionic urethane-urea acrylates. These emulsions are characterized in that they are made up of at least one partially acrylated cycloaliphatic polyisocyanate, which is acrylated by a hydroxyalkyl acrylate (to the extent of 10–60 equivalent-% NCO). The product is then reacted with a polyhydroxy compound (to the extend of 20–75 equivalent-% NCO), and then with a sodium salt of an aminocarboxylic acid (to the extent of 5–15 equivalent-% NCO). Finally the resulting product is reacted with water and/or an aliphatic diamine (in amounts corresponding to 1–5 equivalent-% NCO).

Another object of this invention is to provide a method fo preparing such storage-stable, radiation-hardenable, NCO-free aqueous emulsions based on ionic urethane-urea acrylates.

DETAILED DESCRIPTION OF THE PREFERRED EMBODIMENTS

The method of this invention is characterized in that the reaction product of the cycloaliphatic polyisocyanate with the hydroxy acrylate compounds and the polyols is taken up into an ordinary organic solvent. These solvent-containing reaction products are then combined with an aqueous solution of a sodium salt of an aminocarboxylic acid, and then with water and/or with an amount of an aliphatic diamine corresponding to 1–5 equivalent-% NCO. The organic solvent is then distilled off.

Urea segments are advantageous modifiers of the film-forming properties of polyurethanes with respect to tear-resistance and stretching, as well as with respect to the wear properties and adhesion of the film. Because of the limited compatibility of urea groups with urethane groups in polyfunctional resin systems which are improved by suitable "reactive thinners" (e.g., vinylpyrrolidone or alkyl acrylates), it is surprising that the acrylic-urethane-urea aqueous emulsion of this invention is both free of any "reactive thinners", and compatible and stabile.

The cycloaliphatic polyisocyanates used in this invention may be C$_5$–C$_{20}$ cycloaliphatic polyisocyanates. They may be cyclic diisocyanates such as C$_5$–C$_{20}$ cyclic diisocyanates, including isophoronediisocyanate (IPDI), methylenebis(4-cyclohexylisocyanate) (Hylene-W), bis(isocyanatomethyl)cyclohexane (HXDI), and analogous substituted structures:

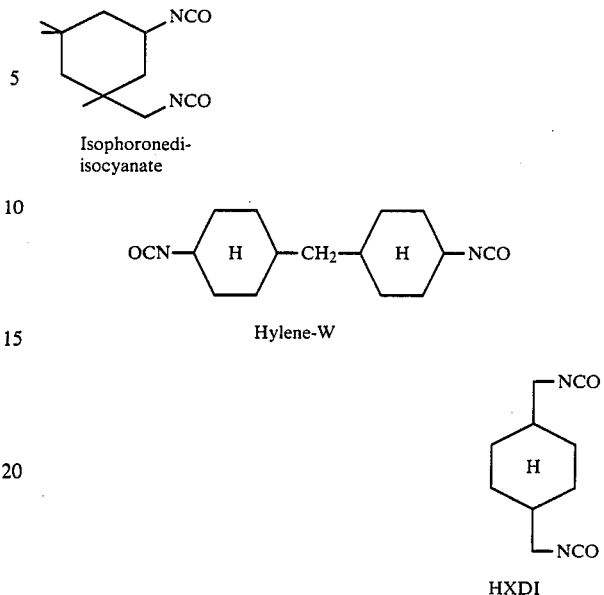

These cyclic diisocyanates may be used singly or in combination with each other.

A particularly suitable organic solvent which may be used is acetone. Other candidates include tetrahydrofuran and methyl ethyl ketone. The solvents can be used in combination with each other.

Suitable compounds for acrylating the dispersions of this invention are hydroxyalkyl acrylates, e.g. C$_1$ to C$_{10}$ hydroxyalkyl acrylates, preferably hydroxyethyl acrylate (HEA). Suitable polyols for urethane resin formation in the claimed dispersions are C$_2$–C$_{10}$ hydroxy esters and C$_2$–C$_{10}$ hydroxy ethers, particularly poly(1,4-dihydroxybutanes) with molecular weights of 500–2,000 (Mw); and also C$_2$–C$_{15}$ triols such as Trimethylolpropane (TMP) or glycerine. The use of any of these for the claimed equivalent-percents of NCO is particularly suitable.

Suitable aminocarboxylic acids may be any C$_2$–C$_{15}$ aminocarboxylic acids, e.g., aminoacetic acid, aminobutyric acid, aminopropanoic acid, and particularly aminohexanoic acid. Suitable diamines may be any, C$_2$–C$_{15}$ diamines e.g., ethylenediamine, 1,6-hexanediamine, isophoronediamine, and particularly trimethyl-1,6-hexanediamine (TMD).

The most suitable emulsifier for emulsifying the resins of this invention is the NCO-reactive aminohexanoic acid (in the form of its sodium salt). It is formed in very simple fashion by saponification of caprolactam with NaOH.

The resin is emulsified with the above-mentioned emulsifiers in the acetone solution of the still NCO-containing resin in just a few minutes, with the formation of urea. After addition of the remaining amounts of water and diamine, and removal of acetone by distillation, a finely-dispersed urethane-urea-acrylic emulsion with high storage stability is obtained. The urea formation occurs via the reaction of an aminocarboxylic acid, water, and a diamine.

The dispersions prepared in accordance with this invention are also free of all other organic solvents or "reactive thinners". Starting with about 55 percent solids, they may be thinned with arbitrary amounts of water and applied. They may be pigmented or thickened. They form high gloss films or coatings, but may alternatively be matted, i.e., caused to have a matte finish.

The dispersions prepared in accordance with this invention are stabile when stored in darkness over a period of months. The radiation-hardened coatings are very light- and weather-stabile; they may in addition be stabilized with the aid of stabilizers well known in the art.

The set of properties of the dispersions prepared according to this invention may be considered similar to those of the similarly structured polyurethane-urea acrylates which contain "reactive thinners". E.g., they may be regarded as the same with respect to the film characteristics of the hardened resins (as demonstrated in the Examples). The present dispersions are particularly useful on absorbtive and porous substrates, such as paper, cardboard, textiles, felts, wood, leather, etc. But they are also advantageously used on non-absorbtive and non-porous substrates.

In addition, in comparison to the above-described systems with "reactive thinners", these inventive aqueous dispersions are odorless systems, in resin form after physical drying as well as after radiation-hardening. There are no appreciable evaporation losses of organic components when the present aqueous dispersions are applied. And there are no detectable adverse environmental effects of their handling and use.

The overall set of characteristics of these dispersions is superior to that of the state of the art. These dispersions may, if necessary, be applied to non-absorptive substrates such as metals and plastics. For example, they bond well to bonderized metals or to plasticizer-containing plastics.

In a preferred embodiment of this invention, after having taking up into an organic solvent the reaction product of the partially acrylated cycloaliphatic polyisocyanates which have been reacted with a polyhydroxy compound, the solvent-containing reaction product is combined with sodium salts of amino carboxylic acids and then with water and/or aliphatic amines. 70-30 weight % solids are obtained in the organic phase and from 60 to 30 weight percent solids are obtained in the aqueous phase. Preferably about 50 percent by weight solids are obtained in the organic phase and from 50-40 percent solids are obtained in the aqueous phase.

Other features of the invention will become apparent in the course of the following descriptions of exemplary embodiments which are given for illustration of the invention and are not intended to be limiting thereof.

EXAMPLE 1

(Comparison Example)

Urethane-urea Acrylic Dispersion:
Basis: 1,6-hexanediisocyanate-polyether (HDI-polyether), 2-hydroxyethyl acrylate (2-HEA), Trimethylolpropane (TMP), and Aminohexanoic acid, sodium salt.

To a receiving vessel containing 1,176 g of 1,6-hexanediisocyanate (HDI) (5 mol) and 2.8 g dibutyltin laurate (DBTL), the following mixture was added dropwise under stirring, at 25°-35° C., over a period of c. 2 hr:

(i) 1,272.7 g of polytetrahydrofuran ether (2 mol) (m.w. about 650, OH number 176 mg KOH/g) (Terathane® 650, manufactured by duPont),
(ii) 352.9 g of 2-HEA (3 mol) (OH number 476 mg KOH/g), and
(iii) 268 g of Trimethylolpropane (TMP) (2 mol).

The mixture obtained was then heated under stirring at 50°-60° C. for c. 3-4 hr, until formation of an NCO-containing resin (1.4-1.6 wt. % NCO). After addition of 3,071 g acetone, the material became gelatinized in the vessel.

EXAMPLE 2

(Comparison Example)

Urethane-ureaAcrylic Dispersion:
Basis: Methyl-1,5-pentanediisocyanate (MPDI), Polyether, 2-HEA, Trimethylolpropane (TMP), and Aminohexanoic acid, sodium salt.

In a manner analogous to Example 1, 1,176 g of MPDI (7 mol) was reacted.

Here the product gelatinized even before the addition of the acetone thinner.

EXAMPLE 3

(Comparison Example)

Urethane-urea Acrylic Dispersion:
Basis: 1,6-hexanediisocyanate-polyether (HDI-polyether), 2-hydroxyethyl acrylate (2-HEA), and Aminohexanoic acid, sodium salt.

To a receiving flask containing 672 g of HDI (4 mol) and 1.1 g of DBTL, the following mixture was added dropwise under stirring, at 25°-35° C., over a period of c. 1 hr:

(i) 1,272.7 g of polytetrahydrofuran ether (2 mol) (OH number 176 mg KOH/g) (Tetrathane® 650, manufactured by duPont), and
(ii) 235.3 g of 2-HEA (2 mol) (OH number 476 mg KOH/g).

The resulting mixture was then heated under stirring at 50°-60° C. for c. 3-4 hr, until formation of an NCO-containing resin (3.9 wt. % NCO). After the addition of 2,181.1 g of acetone, 619 g aminohexanoic acid and sodium salt (as a 30% aqueous solution) were added to the reaction product, under stirring, at 40°-50° C., over a period of 5 min. Then 3,117 g of water was added to the reaction product. The acetone was removed from the acetone-containing aqueous dispersion with a rotary evaporator. In the process, phase separation occurred, with partial sedimentation of the dispersion. Coating tests gave surface films which were dull (with a matte appearance) and cracked. After 24 hr, the suspension hardened to a solid mass.

EXAMPLE 4

(Comparison Example)

Urethane-urea Acrylic Dispersion:
Basis: Methyl-1,5-pentanediisocyanate (MPDI), Polyether, 2-HEA, and Aminohexanoic acid, sodium salt.

In a manner analogous to Example 3, 672 g of MPDI (2 mol) was reacted. After distillative removal of the acetone component, the resulting fine-particle dispersion formed a matte film when applied to a surface. After storage for 24 hr, the dispersion had acquired a pasty consistency. After thinning with water, phase separation occurred, to yield a solid and water.

EXAMPLE 5

(Comparison Example)

Urethane-urea Acrylic Dispersion:

Basis: Trimethyl-1,6-hexanediisocyanate (TMDI), Polyether, 2-HEA, and Aminohexanoic acid, sodium salt.

In a manner analogous to Example 3, 840 g of TMDI (4 mol) was reacted, up to the formation of an NCO-containing resin (3.6 wt. % NCO). After the addition of 2,349.1 g of acetone, 616 g of aminohexanoic acid and sodium salt (as a 30% aqueous solution) were added to the reaction product, under stirring, at 40°–50° C., over a period of 5 min. Then 3,369.8 g of water was added to the reaction product. The acetone was removed from the acetone-containing aqueous dispersion with a rotary evaporator. The dispersion formed matte, cracked films. After storage for 24 hr, phase separation occurred, to yield a solid and water.

EXAMPLE 6

Urethane-urea Acrylic Dispersion:

Basis: IPDI-polyether, 2-HEA, Trimethylolpropane (TMP), and Aminohexanoic acid, sodium salt.

In a manner analogous to Example 1, 1,554 g of IPDI (7 mol) plus 3.4 g of DBTL were reacted (in place of the 1,6-hexanediisocyanate), up to the formation of an NCO-containing resin (1.4 wt. % NCO). After the addition of 3,451 g of acetone, 469.3 g aminohexanoic acid and sodium salt (as a 30% aqueous solution) were added to the reaction product, under stirring, at 40-50° C., over a period of 5 min. Then 5,059 g water was added to the reaction product. The acetone was removed from the acetone-containing aqueous dispersion in a rotary evaporator.

The solids content of the dispersion was c. 40 wt. % The viscosity of the dispersion was 17 sec (DIN 4, cup). The storage-stability in darkness at 60° C. was >2 months.

The following data were obtained on steel plates after physical drying of the dispersion:

Hardness (Koenig pendulum test, DIN 53 157): 45 sec.
Erichsen cupping (DIN 53 156): >10.0 mm.

The following data relating to films and coatings on steel plates were obtained after hardening of the dispersion at 200 Watt/in, in 5 seconds, with addition of 2.5 wt. % (based on the weight of the solids) of 1-(4-isopropylphenyl)-2-hydroxy-2-methyl-1-propanone (Darocur® 1 116, manufactured by Merck, of Darmstadt):

Hardness (Koenig pendulum test, DIN 53 157): 119 sec.
Erichsen cupping (DIN 53 156): >10.0 mm.
Layer thickness: 130 microns.
Tensile strength (DIN 53 455): 37.5 +/−4.0 N/mm$^2$.
Elongation at breakage: (8+/−4)%.

EXAMPLE 7

Urethane-urea Acrylic Dispersion:

Basis: IPDI-polyether, 2-HEA, Trimethylolpropane (TMP), and Amlnohexanoic acid, sodium salt.

To a receiving flask containing 1,110 g of IPDI (5 mol) and 2.8 g of DBTL, the following mixture was added dropwise under stirring, at 25°–35° C., over a period of c. 2 hr:

(i) 1,145.4 g of polytetrahydrofuran ether (1.8 mol) (m.w. about 650, OH number 176 mg KOH/g) (Terathane® 650, manufactued by duPont), (ii) 235.3 g of 2-HEA (2 mol) (OH number 476 mg KOH/g), and (iii) 134 g of Trimethylolpropane (TMP) (1 mol).

The resulting mixture was then heated under stirring to 50°–60° C. c. 3–4 hr, until formation of an NCO-containing resin (2.4 wt. % NCO). After the addition of 2,754.8 g of acetone, 398 g of aminohexanoic acid and sodium salt (as a 30% aqueous solution) were added to the reaction product, under stirring, at 40°–50° C., over a period of 5 min. Then 3,610 g of water and 31.6 g of trimethyl-1,6-hexanediamine (TMD) (0.2 mol) were added to the reaction product. The acetone was removed from the acetone-containing aqueous dispersion with a rotary evaporator.

The solids content of the dispersion was approx. 42.0 wt. %. The viscosity of the dispersion was 18 sec (DIN 4, cup). The storage stability in darkness at 60° C. was >2 months.

The following data were obtained on steel plates after physical drying of the dispersion:

Hardness (Koenig pendulum test, DIN 53 157): 19 sec.
Erichsen cupping (DIN 53 156): >10.0 mm.

The following data relating to films and coatings on steel plates were obtained after hardening of the dispersion at 200 Watt/in, in 5 seconds, with addition of 2.5 wt. % Darocur® 1 116:

Hardness (Koenig pendulum test, DIN 53 157): 45 sec.
Erichsen depression (DIN 53 I56): >10.0 mm.
Layer thickness: 145 microns.
Tensile strength (DIN 53 455): 27.2+/−4.5 N/mm$^2$.
Elongation at breakage: (105+/−14)%.

EXAMPLE 8

Urethane-urea Acrylic Dispersion:

Basis: IPDI-polyether, 2-HEA, Trimethylolpropane (TMP), and Aminohexanoic acid, sodium salt.

To a receiving flask containinng 1,332 g of IPDI (6 mol) and 3.6 g of DBTL, the following mixture was added dropwise under stirring, at 25-35° C., over a period of c. 2 hr:

(i) 1,781.8 g of polytetrahydrofuran ether (2.8 mol) (OH number 176 mg KOH/g) (Terathane® 650, manufactured by duPont), (ii) 235.3 g of 2-HEA (2 mol) (OH number 476 mg KOH/g), and (iii) 134 g of Trimethylolpropane (TMP) (1 mol).

The resulting mixture was then heated under stirring to 50°–60° C. for c. 3–4 hr, until formation of an NCO-containing resin (1.89 wt. % NCO). After the addition of 3,614 g of acetone, 477.5 g aminohexanoic acid and sodium salt (as a 30% aqueous solution) were added to the reaction product, under stirring, at 40°–50° C., for a period of 5 min. Then 4,749 g of water and 31.6 g of trimethyl-1,6-hexanediamine (TMD) (0.2 mol) were added to the reaction product. The acetone was removed from the acetone-containing aqueous dispersion with a rotary evaporator.

The solids content of the dispersion was approx. 42.0 wt. %. The viscosity of the dispersion was 16 sec (DIN 4, cup). The storage stability in darkness at 60° C. was >2 months.

The following data were obtained on steel plates after physical drying of the dispersion:

Hardness (Koenig pendulum test, DIN 53 157): 13 sec.
Erichsen cupping (DIN 53 156): >10.0 mm. The following data relating to films and coatings on steel plates were obtained after hardening of the dispersion at 200 Watt/in, in 5 seconds, with addition of 2.5 wt. % Darocur® 1 116:
Hardness (Koenig pendulum test, DIN 53 157): 24 sec.
Erichsen cupping DIN 53 156): >10.0 mm.
Layer thickness: 94 microns.
Tensile strength (DIN 53 455): 19.0+/−1.3 N/mm².
Elongation at breakage: (135+/−7)%.

EXAMPLE 9

Urethane-urea Acrylic Dispersion:
Basis: Hylene-W, Polyether, 2-HEA, Trimethylolpropane (TMP), and Aminohexanoic acid, sodium salt.

In a manner analogous to Example 8, 1,572 g of Hylene-W (6 mol) was reacted, until formation of an NCO-containing resin (1.3 wt. % NCO).

After the addition of 3,854 g acetone, 486.7 g of aminohexanoic acid and sodium salt (as a 30% aqueous solution) were added to the reaction product, under stirring, at 40°–50° C., for a period of 5 min. Then 5,915.7 g of water was added to the reaction product. The acetone was removed from the acetone-containing aqueous dispersion with a rotary evaporator.

The solids content of the dispersion was approx. 39 wt. %. The viscosity of the dispersion was 17 sec (DIN 4, cup). The storage stability in darkness at 60° C. was >2 months.

The following data were obtained on steel plates after physical drying of the dispersion:
Hardness (Koenig pendulum test, DIN 53 157): 17 sec.
Erichsen cupping (DIN 53 156): >10.0 mm.
The following data relating to films and coatings on steel plates were obtained after hardening of the dispersion at 200 Watt/in, in 5 seconds, with addition of 2.5 wt. % Darocur® 1 116:
Hardness (Koenig pendulum test, DIN 53 157): 33 sec.
Erichsen cupping (DIN 53 156): >10.0 mm.
Layer thickness: 125 microns.
Tensile strength (DIN 53 455): 21.5+/−4.5 N/mm².
Elongation at breakage: (110+/−14)%.

EXAMPLE 10

Urethane-urea Acrylic Dispersion:
Basis: HXDI, Polyether, 2-HEA, Trimethylolpropane (TMP), and Aminohexanoic acid, sodium salt.

In a manner analogous to Example 8, 1,164 g of HXDI (6 mol) was reacted, until formation of an NCO-containing resin (1.3 wt. % NCO). After the addition of 3,446 g of acetone, 435.2 g of aminohexanoic acid and sodium salt (as a 30% aqueous solution) were added to the reaction product, under stirring, at 40°–50° C., for a period of 5 min. Then 7,395 g of water and 15.8 g trimethyl-1,6-hexanediamine (TMD) (0.1 mol) were added to the reaction product. The acetone was removed from the acetone-containing aqueous dispersion with a rotary evaporator.

The solids content of the dispersion was approx. 32 wt. %. The viscosity of the dispersion was 39 sec (DIN 4, cup). The storage stability in darkness at 60° C. was >2 months.

The following data were obtained on steel plates after physical drying of the dispersion:
Hardness (Koenig pendulum test, DIN 53 157): 15 sec.
Erichsen cupping DIN 53 156): >10.0 mm.
The following data relating to films and coatings on steel plates were obtained after hardening of the dispersion at 200 Watt/in, in 5 seconds, with addition of 2.5 wt. % Darocur®1 116:
Hardness (Koenig pendulum test, DIN 53 157): 30 sec.
Erichsen cupping (DIN 53 156): >10.0 mm.
Layer thickness: 84 microns.
Tensile strength (DIN 53 455): 5.6+/−1.0 N/mm².
Elongation at breakage: (57+/−12)%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A storage stabile, radiation-hardenable, NCO-free aqueous emulsion based on an ionic urethane-urea acrylate; said emulsion being prepared as follows:
   (1) partially acrylating a cycloaliphatic polyisocyanate with a hydroxyalkyl acrylate to the extent of 10 to 60 equivalent % of the NCO groups;
   (2) reacting the partially acrylated cycloaliphatic polyisocyanate obtained in step (1) with (i) a polyhydroxy compound to the extent of 20 to 75 equivalent % of the NCO groups, (ii) then with a sodium salt of an aminocarboxylic acid to the extent of 5 to 15 equivalent % of the NCO groups, and (iii) finally with water or an aliphatic diamine in an amount corresponding to 1 to 5 equivalent % of the NCO groups.

2. The emulsion of claim 1, wherein the said cycloaliphatic polyisocyanate is a $C_5$ to $C_{20}$ cycloaliphatic polyisocyanate.

3. The emulsion of claim 1, wherein the said cycloaliphatic polyisocyanate is a $C_5$ to $C_{20}$ cyclic diisocyanate.

4. The emulsion of claim 1, wherein the said cycloaliphatic polyisocyanate is a isophoronediisocyanate, methylenebis(4-cyclohexyl isocyanate) or bis-(isocyanatomethyl)cyclohexane.

5. The emulsion of claim 1, wherein the said hydroxyalkyl acrylate is a $C_1$ to $C_{10}$ hydroxyalkyl acrylate.

6. The emulsion of claim 1, wherein the said hydroxyalkyl acrylate is hydroxyethyl acrylate.

7. The emulsion of claim 1, wherein the said polyhydroxy compound is a $C_2$-$C_{10}$ hydroxy ester or a $C_2$-$C_{10}$ hydroxy ether.

8. The emulsion of claim 1, wherein the said polyhydroxy compound is a poly(1,4-dihydroxybutane) having a molecular weight of from 500 to 2000.

9. The emulsion of claim 1, wherein the said polyhydroxy compounds is a $C_2$-$C_{15}$ triol.

10. The emulsion of claim 1, wherein the said polyhydroxy compound is Trimethylolpropane or glycerine.

11. The emulsion of claim 1, wherein the said aminocarboxylic acid is a $C_2$-$C_{15}$ aminocarboxylic acid.

12. The emulsion of claim 1, wherein the said aminocarboxylic acid is aminoacetic acid, aminobutyric acid, aminopropanoic acid or aminohexanoic acid.

13. The emulsion of claim 1, wherein the said aliphatic diamine is a $C_2$-$C_{15}$ diamine.

14. The emulsion of claim 1, wherein the said diamine is ethylenediamine, 1,6-hexanediamine, isophoronediamine, or trimethyl-1,6-hexanediamine.

15. A method for preparing a storage-stabile, radiation-hardenable, NCO-free aqueous emulsion based on an ionic urethane-urea acrylate; said method comprising:
   (i) taking up into an organic solvent the reaction product of a cycloaliphatic polyisocyanate which was been reacted, successively with a hydroxyalkyl acrylate to the extent of 10 to 60 equivalent % of the NCO groups and a polyhydroxy compount to the extend of 20 to 75 equivalent % of the NCO groups;

(ii) combining the mixture of step (i) first with an aqueous solution of a sodium salt of an aminocarboxylic acid to the extent of 5 to 15 equivalent % of the NCO groups, and then with water or an amount of an aliphatic diamine corresponding to 1 to 5 equivalent % of the NCO groups; and, (iii) distilling off the said organic solvent.

16. The method of claim 15, comprising using acetone, tetrahydrofuran, methyl ethyl ketone or a mixture thereof, as the said organic solvent.

17. The method of claim 15, comprising obtaining (in step ii) from 70 to 30 wt. % solids in the organic phase and from 60 to 30 wt. % solids in the aqueous phase.

18. The method of claim 15, comprising obtaining (in step ii) about 50% by wt. solids in the organic phase and from 50 to 40% by wt. solids in the aqueous phase.

* * * * *